July 9, 1968     H. J. YOUNG     3,392,286
REFRIGERATING APPARATUS
Filed Dec. 28, 1964

INVENTOR.
Howard J. Young
BY Carl A. Stickel
His Attorney

United States Patent Office 3,392,286
Patented July 9, 1968

3,392,286
REFRIGERATING APPARATUS
Howard J. Young, Dayton, Ohio, assignor to General Motors Corporation, Detroit, Mich., a corporation of Delaware
Filed Dec. 28, 1964, Ser. No. 421,406
1 Claim. (Cl. 307—141)

ABSTRACT OF THE DISCLOSURE

In the preferred form, the control system is applied to a belt type icemaker. The belt has projections for operating from the normal to the periodic position a double throw switch having its movable contact connected to one of the supply conductors and having its stationary contacts separately connected to the two stationary contacts of a second double throw switch. A timer motor is provided with a cam for moving the second double throw switch from either position to the other. The timer motor is connected in parallel with the solenoid of the water fill valve and both are connected between the movable contact of the second double throw switch and the second supply conductor. Each movement of the first double throw switch to its periodic position energizes both the timer motor and the solenoid valve for a timed period at the end of which the second double throw switch is moved from one position to the other. Upon the return of the first double throw switch to its normal position, the timer motor and the solenoid valve are energized a second time during which the timer motor returns the second double throw switch to its original position ready for a repeat operation.

---

Figures 1, 2:
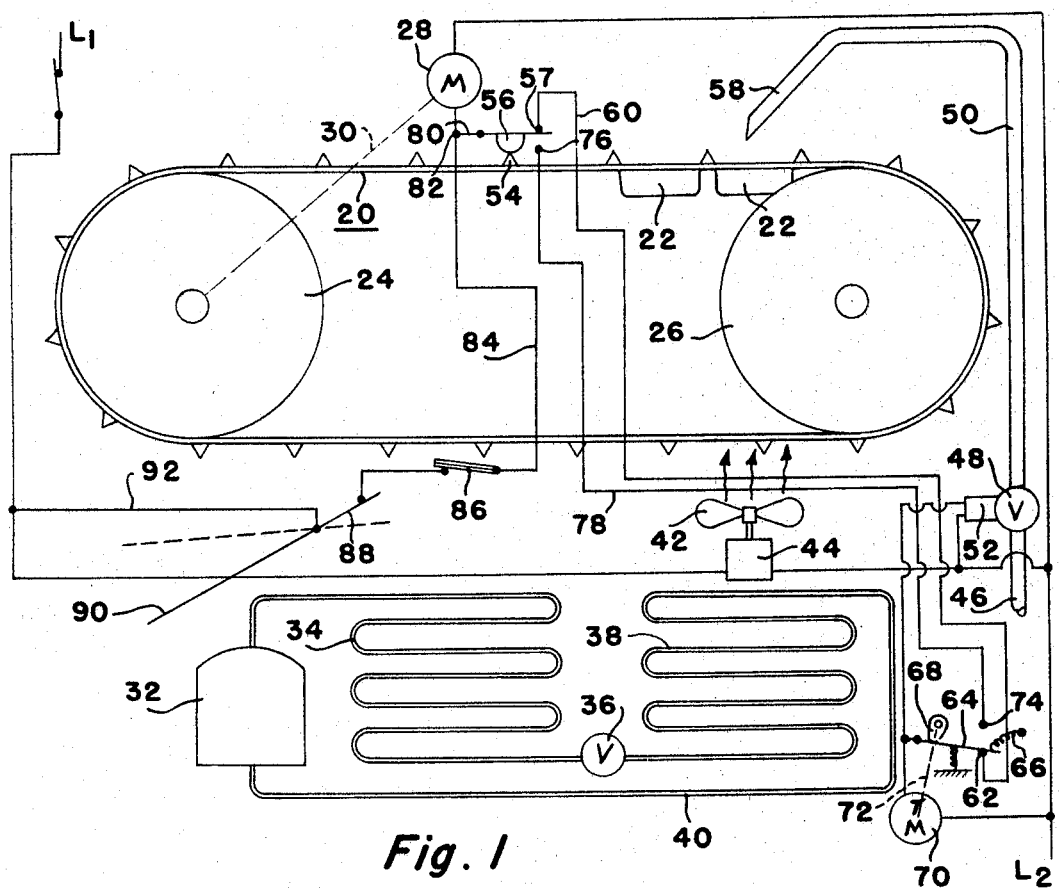

This invention pertains to refrigerating apparatus and more particularly to control systems in which a control device such as an electrically operated valve is held in one position for a predetermined time and then returned to its normal position.

Systems for a measured flow initiated at any time are required in many automatic devices. One of the uses for such systems is the fill system for an automatic icemaker where it is necessary for the mold to be filled to a predetermined level at the beginning of the freezing period. Such a fill system should be simple, accurate and reliable. Particularly such a system should deliver the same amount of water or liquid regardless of how long the initiating contact or switch is held closed.

While it is natural to expect this to be an elementary and very simple problem, the practical solution is unexpectedly difficult when uniform, precise duration of flow is desired at a particular place at a particular time. The difficulty lies in providing an electric circuit and an electric timer which will stop the flow while the initiating switch is closed and yet will reset readily for restarting prior to the next closing of the initiating switch. For example, if the timer motor is connected in series with the initiating switch, and also the stopping switch, and the stopping switch is used to stop the operation of the timer motor at the end of the timed period, the timer motor cannot be restarted except by the provision of an additional switch. There is also a difficulty in providing a satisfactory control for the additional switch needed to start such a system. A complicated holding circuit system might be used for overcoming this difficulty, but this involves the use of relatively expensive holding relays.

It is therefore an object of this invention to provide a control system in which both the initiating switch and the timer control arrangement will reset themselves in such a way as to be ready for a new initiation following the conclusion of the timed period.

It is another object of this invention to provide an electrically timed flow control system which is simple, accurate and reliable and which will have a minimum of contact difficulties.

It is another object of this invention to provide a constant timed control system which will keep the same total operating time regardless of how long the initial tripping or energization is continued.

These and other objects are attained in the form shown in the drawings in which the fill system is shown applied to a belt type icemaker. The belt is provided with a means for closing a switch for a period of time at the proper time to deliver the water to one of the compartments of the belt. The operation of this switch initiates the operation of a timer motor as well as opens a solenoid valve which is connected in parallel with the timer motor. The timer motor at the end of a predetermined time operates a double throw switch from one position to another to provide a first termination of the open period of the valve by the deenergization of the solenoid. After the belt operation of its fill switch, the fill switch returns to normal position thereby energizing the solenoid valve and the timer motor a second time which will provide a short additional fill period for the valve while the timer motor operates its double throw switch back to its normal original position so as to be prepared for the succeeding operation of the belt switch.

Further objects and advantages of the present invention will be apparent from the following description, reference being had to the accompanying drawings wherein a preferred embodiment of the present invention is clearly shown.

In the drawings:

FIG. 1 is a diagrammatic representation of a belt type icemaker together with a refrigerating system, a fill system and a control system; and FIG. 2 is a simplified wiring diagram of the control system shown in FIG. 1.

Referring now to the drawings and more particularly to FIG. 1, there is shown a belt type icemaker having a belt 20 having a series of ice molds 22 which are mounted on spaced pulleys 24 and 26 in a space which is kept at below freezing temperatures by a refrigerating system. The pulley 24 is slowly driven normally by an electric motor 28 through a drive mechanism indicated diagrammatically by the dotted line 30. The space containing the belt 20 is kept at below freezing temperatures by a refrigerating system which includes a sealed motor compressor unit 32 which delivers compressed refrigerant to the condenser 34 from which liquefied refrigerant is fed under the control of a valve or other suitable restrictor device 36 to an evaporator 38 where the liquid refrigerant is evaporated and returned through the suction conduit 40 to the sealed unit 32. A fan 42 driven by the electric motor 44 circulates the cold air around the belt for freezing liquid in the molds or compartments 22 of the belt. A water supply pipe 46 is provided for delivering water under the control of the solenoid valve 48 and the delivery pipe 50 to the mold 22. This solenoid valve 48 includes a solenoid 52 which when energized holds the valve 48 open to deliver the water through the pipe 50 to the mold 22.

This solenoid 52 has one terminal connected to the supply conductor L2 which is also connected to the sealed unit 32 and to the drive motor 28 as well as the fan motor 44. The belt 20 is provided with projections 54 which are located so that they will operate a double throw switch 56 from its normal lowered position to the raised position illustrated in FIG. 1 when one of the molds 22 is beneath the outlet 58 of the delivery pipe 50. Since the motor 28 drives the belt very slowly, the double throw switch will be held in its upper position for a considerable time. This period of time will be too long for a normal opening period of the water valve 48. Therefore according to my invention I provide a timing arrangement to limit and make constant the open period of this valve 48. For this purpose the switch 56 has its upper contact which is engaged in its upper position connected by the conductor 60 to one of the alternate contacts 62 of a double throw timer operated switch 64.

This switch 64 is indicated diagrammatically and may be of any suitable double throw type preferably having a snap acting mechanism 66 and a rotary cam 68 which is operated at a predetermined speed by a clock-type timer motor 70 through an operating mechanism indicated by the dotted line 72. When the switch 56 engages its upper contact 57, it will energize the solenoid 52 to open the valve 48. At the same time it will energize the timer motor 70 which at the end of a predetermined period of operation will operate the switch 64 out of engagement with its contact 62 and into engagement with its contact 74. This disconnects both the solenoid 52 and the timer motor 70 from the supply circuit as long as the switch 56 remains in contact with the contact 57, since the solenoid 52 and the timer motor 70 have been supplied through the conductor 60.

However the motor 28 under normal conditions will continue to operate the belt 20 and after a period of time will release the switch 56 so that it will leave its upper contact 57 and return to engagement with its lower contact 76 which is its normal position. The contacts 76 and 74 are connected by the conductor 78 so that the supply of energy to the timer motor 70 and the solenoid 52 is resumed. This supply of energy will continue until the timer motor 70 operates its switch 64 out of contact with its contact 74 and back into contact with its contact 62. This will stop energization of the solenoid 52 and the timer motor 70 until the switch 56 is again operated. Thus for each mold 22 the valve 48 is open for two short timed periods which is sufficient to provide an accurately measured fill for the mold.

As indicated in the wiring diagram, the solenoid 52 and the timer motor 70 are connected in parallel circuit with each other and in series with the movable blade 64 of the switch which is operated by the timer motor 70. The two alternate contacts 62 and 74 engaged by the switch blade 64 are connected to the two alternate contacts 57 and 76 which are engaged by the switch blade 56. The switch blade 56 is connected by the conductor 80 to a common terminal 82 which is also connected to the adjacent terminal of the drive motor 28. The common terminal 82 is connected through the conductor 84 to a normally closed thermostatic switch 86 which in turn is connected through a normally closed switch 88 have a feeler 90 which is responsive to the accumulation of ice cubes in a collecting bin beneath the belt 20. When the bin is filled the feeler 90 will be lifted to open the switch 88 to stop the operation of the motor 28 and the fill system including the valve 48. The switch 88 is connected by the conductor 92 to the supply conductor L2. The fan motor 44 may be provided with a door switch 94 which will open to stop the fan whenever the door is opened.

This control arrangement provides a simple, reliable, economical, accurate filling system which may be used for icemakers and many other automatic devices wherein a timed flow is initiated by a switch which is operated and held in the operated portion for a considerable period of time.

While the embodiment of the present invention as herein disclosed, constitutes a preferred form, it is to be understood that other forms might be adopted.

What is claimed is as follows:

1. A timing control system including an electrical supply, an electrically operated control device electrically connected to said supply and having energized and de-energized positions, a first double throw switch having a movable contact electrically connected in series with said control device and having two positions provided with alternate circuit connections, a timer motor electrically connected in series with said movable contact of said first switch and energized and operable coincidentally to the energization of said control device and deenergized coincidentally to the deenergization of said control device, said timer motor having means effective when energized for moving said first double throw switch from either of its positions to the other, a second double throw switch having normal and periodic positions provided with alternate circuit connections, a first electrical conductor independently connecting one of the alternate circuit connections of said first double throw switch with one of the alternate circuit connections of said second double throw switch, a second electrical conductor independently connecting the other of the alternate circuit connections of said first double throw switch with the other of the alternate circuit connections of the second double throw switch, and actuating means for moving said second double throw switch from its normal position to its periodic position for closing the circuit to one of said conductors and said timer motor and said control device for providing a first period of energization to move said control device to its energized position for a first timed period, said actuating means also having means for moving said second double throw switch back to its normal position for closing the circuit to the other of said conductors and said timer motor and said control device for providing a second timed period of energization to move said control device to its energized position for a second timed period, said means associated with said timer motor to operate said first double throw switch from one position to another being effective to terminate each of said periods of energization and to stop its own operation and to move said control device to its deenergized position.

References Cited
UNITED STATES PATENTS

| 2,891,175 | 6/1959 | Thiemann et al. | 307—114 X |
| 3,063,003 | 11/1962 | Pirhofer | 307—141 X |

ROBERT K. SCHAEFER, *Primary Examiner.*

ORIS L. RADER, BENJAMIN DOBECK, *Examiners.*

T. B. JOIKE, *Assistant Examiner.*